O. G. PFEIFFER.
AUTOMATIC REVERSING GEARING.
APPLICATION FILED OCT. 15, 1909.
981,940.
Patented Jan. 17, 1911.
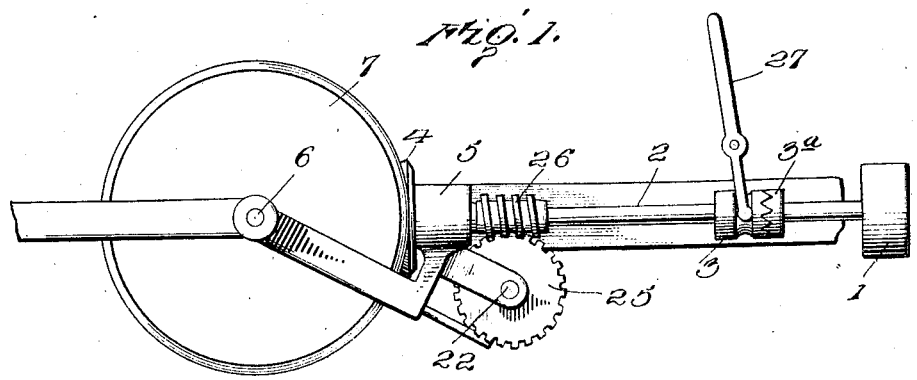
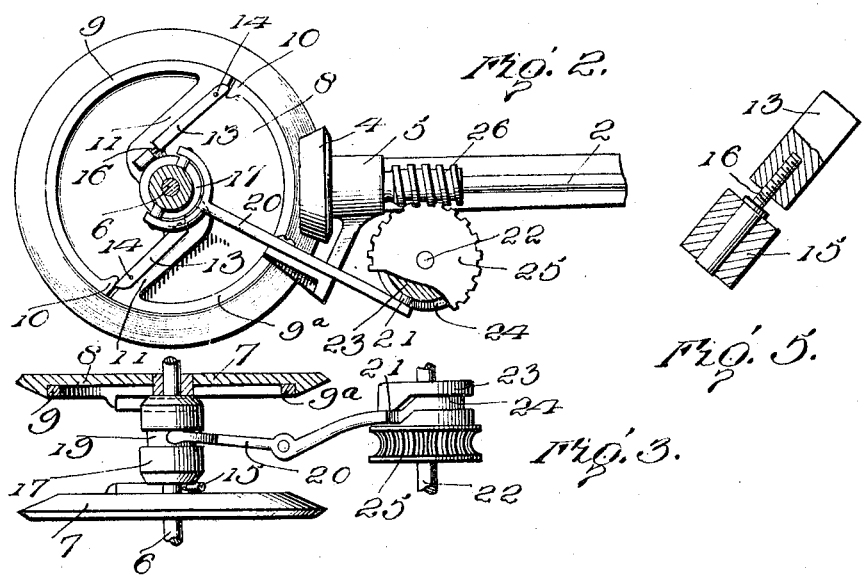
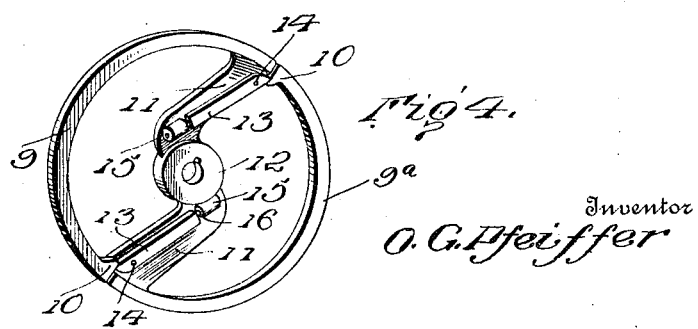
Inventor
O. G. Pfeiffer
Witnesses
By
Attorneys

UNITED STATES PATENT OFFICE.

OTTO G. PFEIFFER, OF SALT LAKE CITY, UTAH, ASSIGNOR TO STANDARD DEVELOPMENT COMPANY, OF SALT LAKE CITY, UTAH, A CORPORATION OF UTAH.

AUTOMATIC REVERSING-GEARING.

981,940.

Specification of Letters Patent.   Patented Jan. 17, 1911.

Application filed October 15, 1909. Serial No. 522,857.   REISSUED

*To all whom it may concern:*

Be it known that I, OTTO G. PFEIFFER, citizen of the United States, residing at Salt Lake City, in the county of Salt Lake and State of Utah, have invented certain new and useful Improvements in Automatic Reversing-Gearing, of which the following is a specification.

My invention relates to gearing for automatically reversing the motion of driven shafts at predetermined intervals, and the object of this invention is to provide a gearing of the character described, particularly adapted to reversing the motion of washing machines, drums and other like apparatus, wherein the direction of motion of a shaft has to be intermittently changed or reversed.

The object of the invention is to provide a very simple form of automatic intermittent reversing gearing which is certain in its action and which is not likely to get out of order.

For a full understanding of the invention and the merits thereof, and to acquire a knowledge of the details of construction, reference is to be had to the following description and accompanying drawings, in which:

Figures 1 and 2 are side views of my improved gearing; Fig. 3 is a top plan view thereof, partly in section; Fig. 4 is a perspective view of one of the parts hereinafter specifically described; Fig. 5 is a fragmentary section of the inner end of one of the levers 13, and the roller carried thereon.

Corresponding and like parts are referred to in the following description and indicated in all the views of the drawings by the same reference characters.

Referring to these figures, 2 designates a driving shaft formed in two sections and having thereon the clutch members 3, 3ª which intermesh with each other, these clutch members being provided with intermeshing teeth. The driving shaft 2 is driven by any suitable mechanism, as by the pulley wheel 1. The shaft is supported in a bearing bracket 5 and carries upon it the bevel wheel 4.

6 designates a transverse driven shaft having thereon the opposed loose bevel wheels 7 which have engagement with the bevel wheel 4. Each of the bevel wheels is annularly recessed, as at 8, and located within this recess of each bevel wheel is a split clutch ring composed of two sections 9 and 9ª, each of the sections being provided at one end with the head 10, these heads being located diametrically opposite to each other. One end of each of the clutch sections is attached to a spoke 11 projecting from a hub 12, the respective hubs being fast upon the driven shaft 6. Pivotally supported on the outer ends of the spokes 11 are the levers 13, these being pivoted at 14. The inner ends of the levers carry a screw 16 supporting the rollers 15. It will be seen that the rollers 15 are opposed to each other on opposite sides of the driven shaft 6 and that when these rollers are forced outward, the levers 13 will be turned and the outer ends thereof forced against the heads 10, thus forcing the clutch sections outward against the rim of the wheel 7. Mounted upon the driven shaft 6, and located between the two bevel wheels 7, is the longitudinally shiftable sleeve 17. The opposite ends of this sleeve are tapering so as to be inserted between and wedge outward the rollers 15 and the levers connected therewith. The sleeve 17 is formed with a groove 19 in which engages a lever 20 pivoted intermediate its ends. The extremity of the lever has a projecting stud 21. Extending transversely of the driving shaft is a cam shaft 22 supporting thereon the cam 23 having the cam groove 24 formed on its circumference. The cam groove is not cut in a straight line around the cam, but is displaced for a portion of its length to one side of the center of the cam and for another portion of its length to the other side of the center, these two portions being connected by oppositely inclined portions. The stud 21 engages in the cam groove so that as the cam is rotated, the lever 20 will be reciprocated once for each complete revolution of the cam.

Mounted on the cam shaft 22 is the worm wheel 25 which meshes with a worm 26 carried by the driving shaft 2. It will be seen that upon a rotary motion being given to the shaft 2, the wheel 4 will be rotated to transmit motion to the loose bevel wheels 7, but that as these wheels are both loose upon the driven shaft, no motion will be communicated to the driven shaft. By means of the worm 26, motion is given in one direction continuously to the worm gear 25, and this acts to oscillate the lever 20 and thus shift the sleeve 17 into engagement first with the clutch on one of the bevel gears 7, and then into engagement with the clutch on the opposed bevel gear. As the clutches are fast on the shaft 6, it follows that the shaft will be given a rotary motion, first in one direction and then in the other. By reason of the fact that the clutches used are friction clutches, there will be but a minimum of shock communicated to the shaft 6 upon each reversal of movement. It will be seen that by means of the shipper lever 27, the driving shaft may be disconnected entirely from the motor mechanism, and thus the motion of the driven shaft 6 entirely stopped, but that when the driving shaft is in engagement with the motor mechanism, the movement of the driven shaft will be alternately in one direction or the other.

My invention is exceedingly simple, entirely positive in its movement, and thoroughly effective in practice.

Having thus described the invention, what I claim is:—

1. The combination with a driving shaft, a beveled gear wheel thereon and a worm thereon, of a transversely extending driven shaft, oppositely disposed loose gear wheels on the driven shaft engaging with the gear on the driving shaft, an oppositely disposed clutch mechanism on the driven shaft, adapted when moved in one direction to engage one of the gear wheels with the driven shaft, and when moved in the opposite direction to disengage it therefrom, a shipping lever engaging at one end with the clutch mechanism to shift the clutch mechanism in opposite directions, a gear wheel engaged by the worm on the driving shaft, a cam moving with the last named gear wheel and having a cam track formed in its face, said lever being provided with a pin engaging with said cam track, whereby the lever may be shifted.

2. The combination with a driving shaft and a beveled driving gear wheel thereon, of a driven shaft, oppositely disposed loose gear wheels thereon engaging with the driving gear wheel and each having an annular flange projecting from the inner face thereof, a longitudinally shiftable shipping collar on the driven shaft located between the gear wheels, oppositely disposed hubs on each side of the shipping collar and fast to the driven shaft, arms on each hub projecting in opposite directions, resilient ring sections each attached at one end to the outer end of one of the arms, the free end of each ring section abutting against the fixed end of the other ring section, said sections being surrounded by the said annular flange on the adjacent gear wheel, a lever pivoted to each one of the arms near the extremity thereof, the outer end of each lever engaging the free end of the adjacent ring section, the inner ends of the levers being engageable by the shipping collar when the latter is shifted, a worm gear on the driving shaft, a gear wheel engaged by the worm gear, a cam movable with the gear wheel and having a cam track in its face, and a shipping lever engaging at one end with the cam track and at the other end engaging with the shipping collar.

3. The combination of a driving shaft, a beveled driving gear wheel thereon, a driven shaft, and oppositely disposed gear wheels thereon engaging with the driving gear wheel and each having an annular flange projecting from the face thereof, a longitudinally shiftable shipping collar beveled on its opposite ends and supported on the driven shaft between the said loose gear wheels, oppositely disposed hubs on each side of the shipping collar fixed to the driven shaft, arms on each hub projecting in opposite directions, resilient ring sections each attached at one end to the outer end of one of the arms, the free end of each ring section abutting against the fixed end of the other ring section, said sections fitting within the said annular flange on the corresponding gear wheel, levers each pivoted to one of the arms near the extremity thereof, the outer end of each lever engaging the free end of the adjacent ring section, rollers on the inner ends of the levers adapted to be engaged by the beveled extremity of the shipping collar to be forced outward thereby, a worm gear on the driving shaft, a gear wheel engaged by the worm gear, a cam rotating with the gear wheel and having a cam track on its face, and a shipping lever engaged at one end with the shipping collar and at the other end engaging with said cam track.

In testimony whereof I affix my signature in presence of two witnesses.

OTTO G. PFEIFFER. [L. S.]

Witnesses:
 EFFIE HILL,
 H. T. DUKE.